United States Patent
Mannan et al.

(10) Patent No.: US 9,836,628 B1
(45) Date of Patent: Dec. 5, 2017

(54) OBJECT IDENTIFICATION THROUGH ELECTROMAGNETIC TAG SIGNATURE

(71) Applicant: International Business Machines Corporation, Armonk, NY (US)

(72) Inventors: Rosanna S. Mannan, San Jose, CA (US); Dennis J. Wurth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/163,102

(22) Filed: May 24, 2016

(51) Int. Cl.
| | | |
|---|---|---|
| *G06K 7/10* | (2006.01) | |
| *G07C 9/00* | (2006.01) | |
| *G01V 3/08* | (2006.01) | |

(52) U.S. Cl.
CPC ............ *G06K 7/10366* (2013.01); *G01V 3/08* (2013.01); *G07C 9/00111* (2013.01)

(58) Field of Classification Search
None
See application file for complete search history.

(56) References Cited

U.S. PATENT DOCUMENTS

| | | | |
|---|---|---|---|
| 6,992,592 B2 | 1/2006 | Gilfix et al. | |
| 7,164,363 B2 | 1/2007 | Kubo et al. | |
| 7,715,277 B2 | 5/2010 | de la Huerga | |
| 2002/0121986 A1 | 9/2002 | Krukowski et al. | |
| 2003/0099158 A1 | 5/2003 | De la Huerga | |
| 2014/0266692 A1* | 9/2014 | Freedman | G08B 21/245 340/539.11 |
| 2015/0130355 A1* | 5/2015 | Rains, Jr. | H05B 37/0227 315/134 |
| 2017/0124816 A1* | 5/2017 | Yang | G08B 5/226 |

FOREIGN PATENT DOCUMENTS

WO 2008066492 A1 6/2008

OTHER PUBLICATIONS

Ervasti, et al., "Touch- and Audio-based Medication Management Service Concept for Vision Impaired Older People", 2011 IEEE International Conference on RFID-Technologies and Applications, 8 pages.

Kaasinen, et al., "Ubimedia based on readable and writable memory tags", Multimedia Systems, vol. 16(2010):1, 17 pages.

Konttila et al., "Touch n' Tag: digital annotation of physical objects with voice tagging", Journal of Assistive Technologies, vol. 6, No. 1, 2012, 16 pages.

(Continued)

*Primary Examiner* — Leon-Viet Nguyen
(74) *Attorney, Agent, or Firm* — Stephanie L. Carusillo

(57) ABSTRACT

In an approach for identifying an object using an electromagnetic tag, an electromagnetic signal is received by a sensor, wherein the electromagnetic signal originates from an electromagnetic tag affixed to an object, and wherein the electromagnetic signal passes through a physical propagation channel. A processor searches a database for an electromagnetic signature corresponding to the electromagnetic signal, wherein the database comprises, at least, object information associated with the electromagnetic signature. A processor determines the electromagnetic signal corresponds to the electromagnetic signature. A processor presents the object information associated with the electromagnetic signature.

14 Claims, 3 Drawing Sheets

(56) References Cited

OTHER PUBLICATIONS

Laput et al., "EMSense: Recognizing Handled, Uninstrumented, Electro-Mechanical Objects Using Software-Defined Radio", UIST '15, Nov. 8-11, 10 pages.
Disneyresearchhub, "EM-Sense: Touch Recognition of Uninstrumented Electrical and Electromechanical Objects", YouTube Video, Published, Nov. 9, 2015, Printed Mar. 25, 2016, 1 page, <https://www.youtube.com/watch?v=fpKDNIe6ia4>.

* cited by examiner

OBJECT IDENTIFICATION THROUGH ELECTROMAGNETIC TAG SIGNATURE

BACKGROUND

The present invention relates generally to the field of electromagnetic waves, and more particularly to object identification using electromagnetic waves.

Electromagnetic (EM) waves are synchronized oscillations of electric and magnetic fields that can be characterized by either the frequency or wavelength of their oscillations to form the electromagnetic spectrum. Many electrical and electromechanical objects emit small amounts of EM noise during operation. When a person makes physical contact with such an object, this EM noise propagates through the person because of the conductivity of the human body. A sensor worn by the person can detect the EM noise and identify the object that emitted the noise.

SUMMARY

Aspects of an embodiment of the present invention disclose a method, computer program produce, and computer system for identifying an object using an electromagnetic tag. A sensor of a device receives an electromagnetic signal wherein the electromagnetic signal originates from an electromagnetic tag affixed to an object, and wherein the electromagnetic signal passes through a physical propagation channel. A processor of the device searches a database for an electromagnetic signature corresponding to the electromagnetic signal, wherein the database comprises, at least, object information associated with the electromagnetic signature. A processor of the device determines the electromagnetic signal corresponds to the electromagnetic signature. A processor of the device presents the object information associated with the electromagnetic signature.

DETAILED DESCRIPTION

Embodiments of the present invention recognize the need to help visually-disabled people identify, and provide information about, objects. In some instances, visually-disabled people use tactile methods, such as braille, to identify objects. For example, a visually-disabled person may attach a braille label to a medication bottle that gives the name of the medication. However, not all visually-disabled people know braille and limited amounts of information can reasonably be conveyed on a braille label. Thus, there is a need for system where a visually-disabled person can identify objects and get more information about the objects more quickly. Embodiments of the present invention provide solutions for identifying an object and obtaining information about the object without having to read braille.

Embodiments of the present invention also recognize that many everyday objects do not emit electromagnetic (EM) noise. For electrical and electromechanical objects, a sensor worn by a visually-disabled person can detect the EM noise and identify these objects. However, a sensor worn by a visually-disabled person cannot identify objects that do not emit EM noise. Thus, there is a need for a way for visually-disable people to identify objects that do not emit EM noise. Embodiments of the present invention provide solutions for identifying an object and obtaining information about the object that does not emit EM noise. In this manner, as discussed in greater detail herein, embodiments of the present invention can provide a way to identify an object and receive additional information about the object through an attached EM tag with a signature EM signal.

The present invention will now be described in detail with reference to the Figures.

Figure 1:
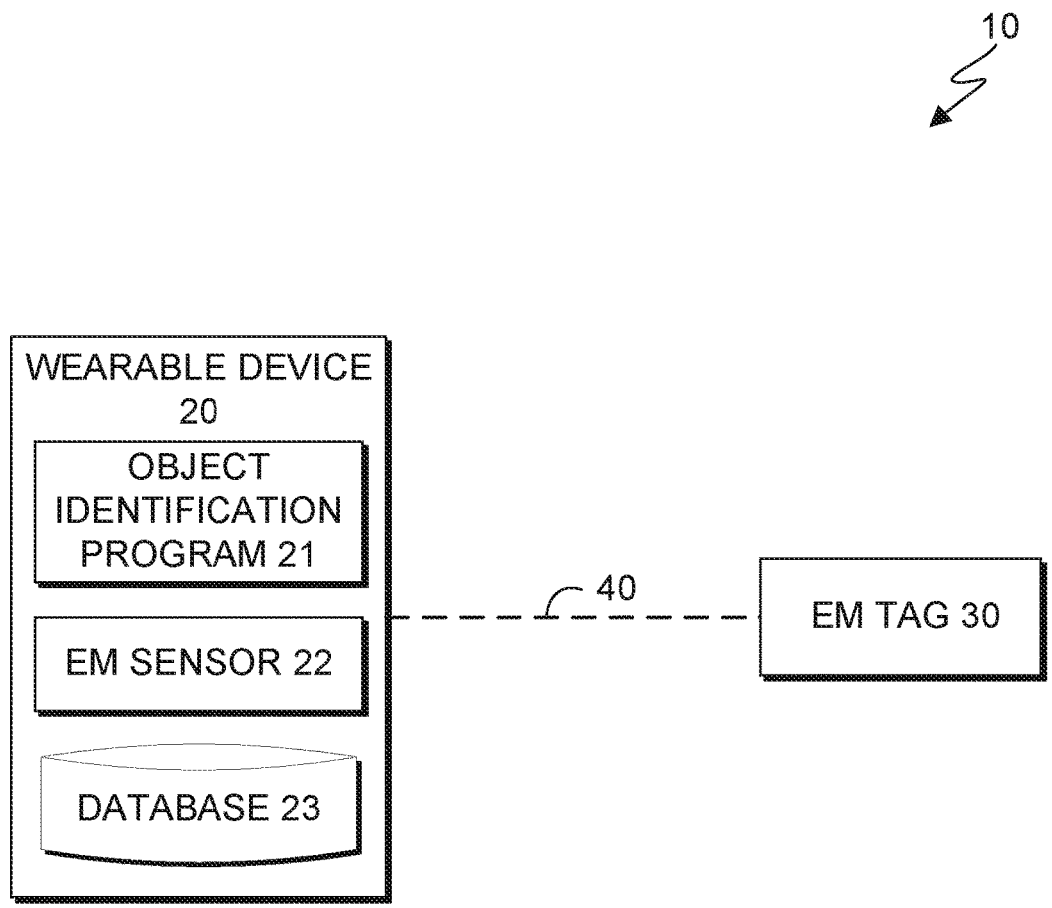
FIG. 1 is a functional block diagram illustrating an electromagnetic tag system environment, in accordance with an embodiment of the present invention.

FIG. 1 depicts a diagram of EM tag system environment 10, in accordance with an embodiment of the present invention. FIG. 1 provides only an illustration of one embodiment and does not imply any limitations with regard to the environments in which different embodiments may be implemented.

In the depicted embodiment, EM tag system environment 10 includes wearable device 20, EM tag 30, and propagation channel 40. EM tag system environment 10 may include additional computing devices, servers, computers, mobile devices, or other devices not shown.

Wearable device 20 is held by a user, worn by a user, or otherwise operably attached to a user. Wearable device 20 may be a smart watch, smart phone, laptop computer, netbook computer, tablet computer, or similar computing device. In general, wearable device 20 may be any electronic device or computing system capable of running an application or program, receiving data from an attached EM sensor, and using a speaker to audibly state object information. In the depicted embodiment, wearable device 20 includes object identification program 2, EM sensor 22, and database 23. In some embodiments, wearable device 20 includes a speaker (not shown) for audibly relaying object information stored in database 23 to a user.

Object identification program 21 operates to present information to a user about an object using an EM tag, such as EM tag 30, emitting a signature EM signal. In the depicted embodiment, object identification program 21 can communicate with EM sensor 22 and database 23. Object identification program 21 can be mobile application software, i.e., an app, which is a computer program typically designed to run on smart phones, tablet computers and other mobile devices. In an exemplary embodiment, object identification program 21 is an app in which a user can assign an EM tag to a specific object, and the user can input object information to be presented to the user. In the depicted embodiment, object identification program 21 receives a detected EM signal from EM sensor 22. Then, object identification program 21 searches database 23 for the signature EM signal corresponding to the received EM signal. Once, object identification program 21 identifies the corresponding signature EM signal, object identification program 21 can identify the associated EM tag and any object information assigned to that EM tag. Finally, object identification program 21 presents the object information to the user. Object information may include the name of the object, how many times a user has touched the object during a certain predefined time period, and any other information the user wants to be told when he or she touches the EM tag. In object identification program 21, a user can program a time period, such as a day or a week, over which the user would like to know how many times the user has touched the object. For example, if the object is a prescription bottle, object information may include the name of the prescription, how many times the user has touched the bottle in a day, what time the user last touched the prescription bottle, when the user is supposed to take the next dose, possible side effects of the prescription, how to take the prescription, and how many doses are remaining in the prescription bottle. In some embodiments, object identification program 21 resides on wearable device 20. In other embodiments, object identification program 21 may reside on another server, or another computing device, provided that object identification program 21 has access to location identifying information associated with wearable device 20.

EM sensor 22 operates to measure EM signals detected through propagation channel 40. A sensor is a device that detects or measures a physical property and then records or otherwise responds to that property, such as vibration, chemicals, radio frequencies, environment, weather, humidity, light, etc. EM sensor 22 can be attached to or a part of wearable device 20. In one embodiment, EM sensor 22 is a conducting electrode connected to a software-defined radio receiver, which converts the incoming EM signal into transmittable data. EM sensor 22 detects an EM signal and then transmits the data related to the detected EM signal to object identification program 21. In the exemplary embodiment, wearable device 20 is a smartwatch worn by a user around the wrist with EM sensor 22 on the underside of the smartwatch touching the user's skin.

Database 23 is a repository for data input by a user using object identification program 21. In the depicted embodiment, database 23 resides on wearable device 20. In another embodiment, database 23 may reside elsewhere within EM tag system environment 10 provided object identification program 21 has access to database 23. A database is an organized collection of data. Database 23 can be implemented with any type of storage device capable of storing data and configuration files that can be accessed and utilized by wearable device 20, such as a database server, a hard disk drive, or a flash memory. Database 23 stores object information input provided by the user in object identification program 21 regarding objects assigned an EM tag with a signature EM signal. For example, when a user attaches EM tag 30 to a fiction book, the user will input this assignment in object identification program 21, the signature EM signal for EM tag 30, and any additional object information the user would like to be associated with the fiction book. Object identification program 21 stores this information in database 23.

EM tag 30 is a device that is attached to an object and emits a signature EM signal. In some embodiments, EM tag 30 represents one or more EM tags within EM tag system environment 10 with each EM tag emitting a different signature EM signal. In some embodiments, EM tag 30 is active and includes a power source to generate the EM signal. In some embodiments, EM tag 30 is passive and receives its input power from the wearable device 20 through propagation channel 40. In some embodiments, the EM signal is between an ultra-high frequency (UHF) radio wave and an extremely high frequency (EHF) microwave, or 300 MHz to 300 GHz.

Propagation channel 40 operates to carry an EM signal from an EM tag to an EM sensor, such as EM sensor 22 of wearable device 20. In some embodiments, propagation channel 40 is a user's body, such as when a user physically touches an EM tag or physically touches an object with an attached EM tag. In other embodiments, wearable device 20 with EM sensor 22 is in direct contact EM tag 30, and no propagation channel is necessary.

Figure 2:
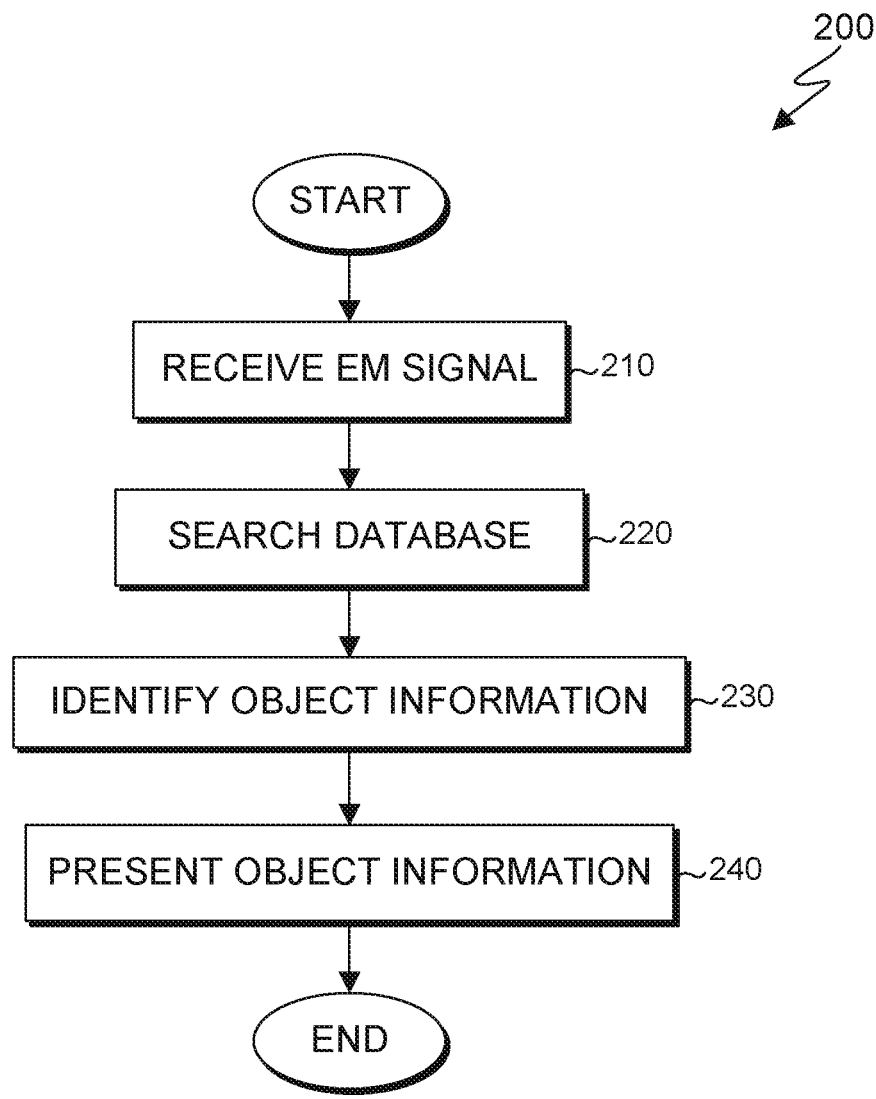
FIG. 2 is a flowchart depicting operational steps of an object identification program, on a wearable device within the environment of FIG. 1, in accordance with an embodiment of the present invention.

FIG. 2 is flowchart 200 depicting operational steps of object identification program 21, executing within EM tag system environment 10 of FIG. 1, in accordance with an embodiment of the present invention. In the depicted embodiment, object identification program 21 operates to present information to a user about an object using EM tag 30, affixed to the object and emitting a signature EM signal.

In step 210, object identification program 21 receives an EM signal. In the depicted embodiment, object identification program 21 receives an EM signal from EM sensor 22, which detected the EM signal emitted by EM tag 30 through propagation channel 40. For example, when a user touches EM tag 30 attached to a blood pressure prescription bottle, the signature EM signal emitting from EM tag 30 propagates through the user, is detected by EM sensor 22, and then, is received by object identification program 21. In another example, when a user touches a flute, or any conductive object, with EM tag 30 attached, the signature EM signal emitting from EM tag 30 propagates through the flute and then through the user, is detected by EM sensor 22, and then, is received by object identification program 21.

In step 220, object identification program 21 searches a database. In the depicted embodiment, object identification program 21 searches database 23, which includes each EM tag's signature EM signal, the object each EM tag has been assigned to, and any object information input by a user. Object identification program 21 searches database 23 for the stored signature EM signal that most closely matches the received EM signal. Slight variations between a detected EM signal and the stored signature EM signal for a specific EM tag can be caused by different placements on a user's body of wearable device 20. Because of these slight variations, object identification program 21 uses a threshold tolerance, an allowable amount of variation of the EM signal, when searching database 23.

In step 230, object identification program 21 identifies object information. Object identification program 21 matches the received EM signal to the stored signature EM signal and corresponding EM tag. Then, object identification program 21 identifies object information corresponding with the identified EM tag, such as the name of the object, how many times a user has touched the object during a certain predefined time period, and any other information the user inputs. Continuing the prescription bottle example, object identification program 21 matches the received EM signal to the stored signature EM signal of EM tag 30, which the user assigned to the prescription bottle. Then, object identification program 21 identifies object information input by the user, such as the name of the prescription, how many times the user has touched the bottle in a day, what time the user last touched the prescription bottle, when the user is supposed to take the next dose, possible side effects of the prescription, how to take the prescription, and how many doses are remaining in the prescription bottle.

In step 240, object identification program 21 presents object information. In some embodiments, object identification program 21 transforms the identified object information into an audio signal and transmits the signal via a speaker of wearable device 20, headphones plugged into wearable device 20, or BLUETOOTH® headphones to audibly present the identified object. Continuing with the prescription bottle example, object identification program 21 will audibly state, "blood pressure prescription bottle." In one embodiment, object identification program 21 audibly presents object information input by the user when a microphone of wearable device 20 hears the user state, "more information." Then, object identification program 21 will audibly present the object information stored in database 23, such as what time the user last touched the prescription bottle, when the user is supposed to take the next dose, possible side effects of the prescription, how to take the prescription, and how many doses are remaining in the prescription bottle. Object identification program 21 uses natural language processing (e.g., deep linguistic processing, sentence splitting, named entry recognition, tokenization, word sense disambiguation, chunking, parsing, and topic segmentation, etc.) to process the semantics of what the microphone hears the user state. In other embodiments, object identification program 21 delivers vibration pulses in Morse code of the object information. In other embodiments, object identification program 21 visually displays the identified object information on wearable device 20. In yet other embodiments, object identification program 21 presents additional object information in any one of the methods described after the user taps wearable device 20.

Figure 3:
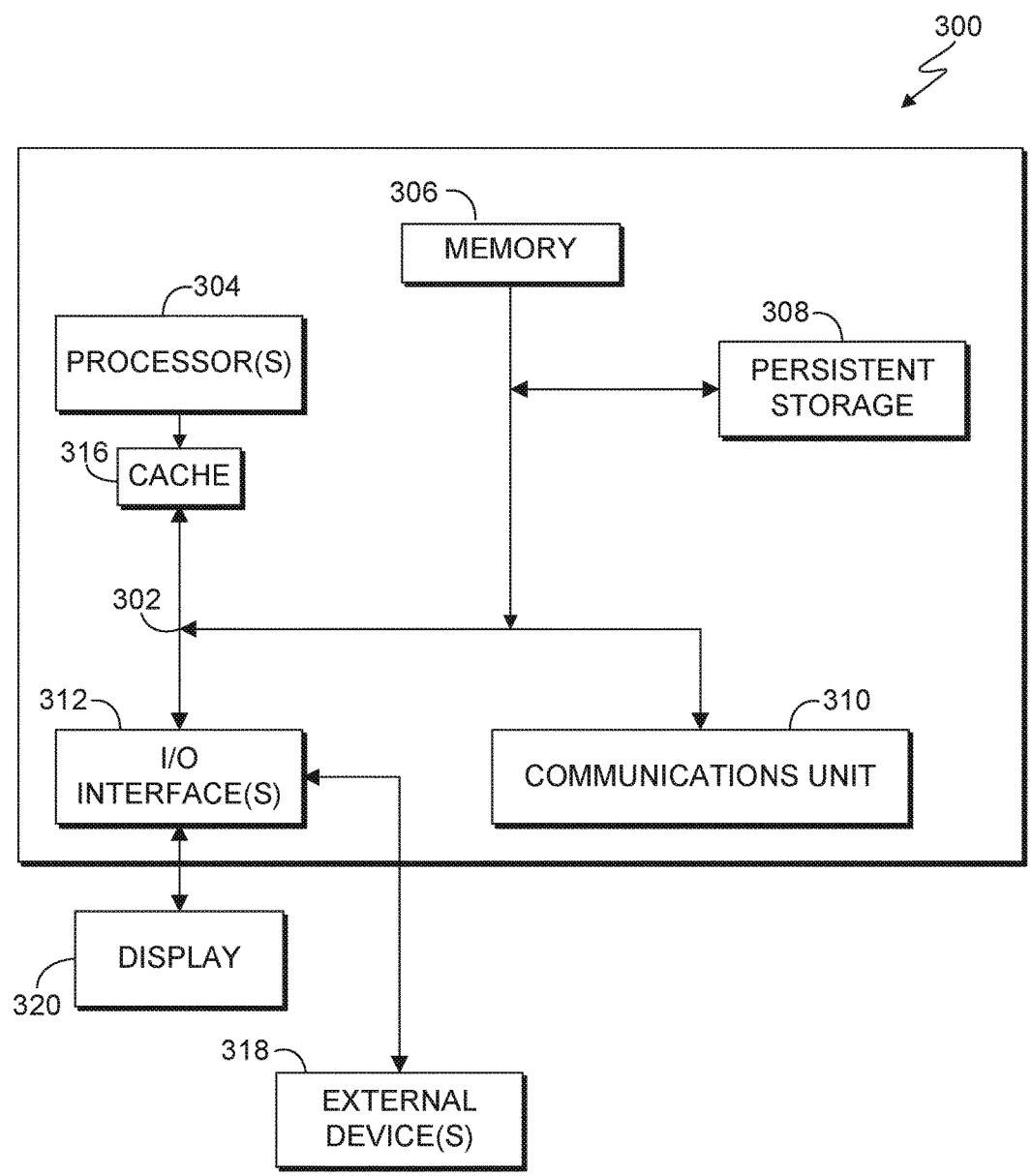
FIG. 3 depicts a block diagram of components of the wearable device executing the object identification program, in accordance with an embodiment of the present invention.

FIG. 3 is a block diagram depicting components of a computer 300 suitable for executing the object identification program 21. FIG. 3 displays the computer 300, the one or more processor(s) 304 (including one or more computer processors), the communications fabric 302, the memory 306, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for object identification program 21 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Object identification program 21 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor. Display 320 may also provide a mechanism to audibly present data to a user and may be, for example, a speaker.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying an object using an electromagnetic tag, the method comprising:

receiving, by a sensor of a device, an electromagnetic signal, wherein the electromagnetic signal originates from an electromagnetic tag affixed to an object, the electromagnetic signal is transmitted from the electromagnetic tag to the sensor through a physical propagation channel, and the physical propagation channel is a person;

determining within a database of the device, by one or more processors, an electromagnetic signature corresponding to the electromagnetic signal, wherein the database comprises, at least, object information associated with the electromagnetic signature, and the object is a prescription bottle and the object information comprises one or more of an identification of the prescription, a number of times the user has touched the prescription bottle during a predefined time period, what time the user last touched the prescription bottle, when the user is supposed to take a next dose, possible side effects of the prescription, how to take the prescription, and how many doses are remaining in the prescription bottle; and presenting, by one or more processors, the object information associated with the electromagnetic signature.

2. The method of claim 1, wherein presenting the object information associated with the electromagnetic signature comprises audibly presenting the object information associated with the electromagnetic signature.

3. The method of claim 1, wherein the electromagnetic signal has a frequency between ultra-high frequency and extremely high frequency, or 300 MHz to 300 GHz.

4. The method of claim 1, wherein the device is a wearable device.

5. The method of claim 1, wherein the device is a smartwatch.

6. A computer program product for identifying an object using an electromagnetic tag, the computer program product comprising:

one or more computer-readable storage media and program instructions stored on the one or more computer-readable storage media, the program instructions comprising:

program instructions to receive an electromagnetic signal, wherein the electromagnetic signal originates from an electromagnetic tag affixed to an object, the electromagnetic signal is transmitted from the electromagnetic tag to the sensor through a physical propagation channel, and the physical propagation channel is a person;

program instructions to determine within a database of the device an electromagnetic signature corresponding to the electromagnetic signal, wherein the database comprises, at least, object information associated with the electromagnetic signature, and the object is a prescription bottle and the object information comprises one or more of an identification of the prescription, a number of times the user has touched the prescription bottle during a predefined time period, what time the user last touched the prescription bottle, when the user is supposed to take a next dose, possible side effects of the prescription, how to take the prescription, and how many doses are remaining in the prescription bottle; and program instructions to present the object information associated with the electromagnetic signature.

7. The computer program product of claim 6, wherein the program instructions to present the object information associated with the electromagnetic signature comprise audibly presenting the object information associated with the electromagnetic signature.

8. The computer program product of claim 6, wherein the electromagnetic signal has a frequency between ultra-high frequency and extremely high frequency, or 300 MHz to 300 GHz.

9. The computer program product of claim 6, wherein the device is a wearable device.

10. The computing program product of claim 6, wherein the device is a smartwatch.

11. A computer system for identifying an object using an electromagnetic tag, the computer system comprising:

one or more computer processors;

one or more computer-readable storage media;

program instructions stored on the computer-readable storage media for execution by at least one of the one or more processors, the program instructions comprising:

program instructions to receive an electromagnetic signal, wherein the electromagnetic signal originates from an electromagnetic tag affixed to an object, the electromagnetic signal is transmitted from the electromagnetic tag to the sensor through a physical propagation channel, and the physical propagation channel is a person;

program instructions to determine within a database of the device an electromagnetic signature corresponding to the electromagnetic signal, wherein the database comprises, at least, object information associated with the electromagnetic signature, and the object is a prescription bottle and the object information comprises one or more of an identification of the prescription, a number of times the user has touched the prescription bottle during a predefined time period, what time the user last touched the prescription bottle, when the user is supposed to take a next dose, possible side effects of the prescription, how to take the prescription, and how many doses are remaining in the prescription bottle; and program instructions to present the object information associated with the electromagnetic signature.

12. The computer system of claim 11, wherein the program instructions to present the object information associated with the electromagnetic signature comprise audibly presenting the object information associated with the electromagnetic signature.

13. The computer system of claim 11, wherein the electromagnetic signal has a frequency between ultra-high frequency and extremely high frequency, or 300 MHz to 300 GHz.

14. The computer system of claim 11, wherein the device is a wearable device.

* * * * *